United States Patent [19]

Ohmer et al.

[11] Patent Number: 4,701,890
[45] Date of Patent: Oct. 20, 1987

[54] DEVICE FOR LOCKING A SET OF GIMBAL-MOUNTED DETECTORS

[75] Inventors: Herve Ohmer, Voisin7s le Bretonneux; Alain G. M. Delpuech, Le Plessis Robinson, both of France

[73] Assignee: Schlumberger Technology Corporation, New York, N.Y.

[21] Appl. No.: 855,024

[22] Filed: Apr. 23, 1986

[30] Foreign Application Priority Data

Dec. 17, 1985 [FR] France ............................... 85 18656

[51] Int. Cl.$^4$ .............................................. G01V 1/00
[52] U.S. Cl. ..................................... 367/25; 367/911
[58] Field of Search ................... 181/105; 367/25, 31, 367/75, 911; 175/45; 33/312, 313

[56] References Cited

U.S. PATENT DOCUMENTS

| | | | |
|---|---|---|---|
| 3,475,722 | 10/1969 | White ..................................... | 367/31 |
| 4,021,774 | 5/1977 | Asmondsson et al. ........... | 175/45 X |
| 4,078,223 | 3/1978 | Strange ................................... | 367/58 |
| 4,534,020 | 8/1985 | O'Brien ........................... | 367/911 X |
| 4,563,757 | 1/1986 | Decorps et al. ....................... | 367/33 |

Primary Examiner—Deborah L. Kyle
Assistant Examiner—Ted L. Parr
Attorney, Agent, or Firm—David P. Gordon; Peter Lee; David G. Coker

[57] ABSTRACT

A logging sonde for evaluating underground formations traversed by a borehole is disclosed. The sonde contains a frame which is free to rotate relative to the cylindrical body of the sonde. The frame supports a plurality of detector means including at least one detector which is free to rotate relative to the frame. Also attached to the frame are locking means including braking means and a solenoid for disengaging the braking means from their engaged surfaces. In a rest position, the braking means are arranged in such a manner as to lock the detector means relative to the cylindrical body. The invention is applicable, in particular, to geophones intended to detect seismic waves along three orthogonal axes, including a vertical axis, regardless of the tilt of the sonde.

20 Claims, 4 Drawing Figures

DEVICE FOR LOCKING A SET OF GIMBAL-MOUNTED DETECTORS

BACKGROUND

The invention relates to a device for locking a set of gimbal-mounted detectors, and more particularly to a device for locking a set of three gimbal-mounted detectors in a logging sonde suitable for being lowered down a borehole. The invention is particularly applicable to geophones for detecting seismic waves along three orthogonal axes including a vertical axis, regardless of the orientation of the sonde. For purposes of clarity, the term "gimbal-mounted" as used herein shall refer to a mounted device having the ability to rotate with either one or two degrees of freedom.

Numerous types of devices exist for acquiring seismic signals. Particularly relevant is the sonde described in the commonly owned U.S. Pat. No. 4,563,757 to Decorps et al. When such a logging sonde is used in a borehole to record seismic waves generated by a distant source, it is preferable to detect the waves by means of a set of three geophones mounted in a three-axis arrangement. In this manner, one is able to evaluate the angle of incidence and the magnitude of the detected waves, and thereby expedite a more complete evaluation of the vertical seismic profile.

Most of the geophones available in the art have mechanical construction characteristics which require them to be placed at particular angles of inclination relative to the vertical (in the present application, vertical meaning the direction taken by a plumb line) in order to obtain optimum detection. For example, the longitudinal axis of the geophones may have to be located at 0 degrees (vertical) or at 90 degrees (horizontal) from the vertical. However, many boreholes deviate from the vertical, which has the direct consequence of causing the detection peformed by a set of geophones which is fixed relative to the sonde to be sub-optimal, and in some cases to be impossible.

In order to take account of these characteristics and thus operate under the best possible conditions, the solution proposed by the instant invention consists in detecting seismic signals along three orthogonal axes including the vertical, and to perform such detection regardless of the borehole deviation. Such an arrangement thus requires one geophone with vertical optimum detection and two geophones with horizontal optimum detection. As described in detail hereinafter, in order to provide for such an arrangement, use may be made of a gimbal mounting between the body of the sonde and a frame housing the three geophones. Systems using a gimbal mounting are known in the logging arts. For example, a system using a gimbal mounting for a dipmetering device is described in commonly owned U.S. Pat. No. 4,453,219 to Clavier et al. With reference to FIG. 2 of the Clavier et al. patent, the sonde contains a frame free to rotate about its longitudinal axis, said frame being equipped with an unbalanced mass and a pendulum. The pendulum is coupled to a potentiometer which measures the tilt of the sonde. Such a system thus seems to be at least partially adapted to performing the desired kinematic function. However, when applied to a set of geophones it is not completely free from drawbacks.

SUMMARY OF THE INVENTION

The inventors have recognized that among the drawbacks of using a set of geophones in conjunction with the teachings of the Clavier et al. patent is the danger that such an arrangement would not ensure against geophone movement during measurement. While, those skilled in the art recognize that any geophone movement, however small it may be, degrades the quality of the recorded seismic signals, the inventors have recognized that geophone movement and signal degradation may result from vibrations excited by the incident seismic wave feeding resonance modes in various parts of the acquisition device. Not only have the inventors recognized these facts, but they have recognized that since the quality of the acoustic coupling between a formation and a geophone is determined, in particular, by the relative positions of the resonance peak(s) and the seismic spectrum of interest, it is necessary to avoid as much as possible the presence of acquisition device resonant frequencies within the spectrum of the seismic waves. Thus, as will be described in detail hereinafter, the inventors have provided a locking device for locking the frame relative to the geophones during seismic signal acquisition. The effect of the locking device is preferably to both prevent movement of the geophones and to displace the resonant frequency of the sonde outside the spectrum of interest.

It is therefore an object of the invention to provide a sonde having a geophone where the geophone is free to rotate with two degrees of freedom relative to the sonde, but where the geophone is locked in position relative to the sonde during measurements.

It is a further object of the invention to provide a sonde with three geophones which permits relative movement between the geophones and the sonde so as to allow the geophones to be aligned along three orthogonal axes including a vertical axis, but which eliminates geophone movement during measurement.

It is another object of the invention to provide a sonde which permits geophones be aligned along three orthogonal axes including a vertical axis, but which eliminates vibrations in the sonde due to resonance caused by the seismic waves which are to be measured.

It is yet another object of the invention to provide a sonde which permits geophones to be aligned along three orthogonal axes including a vertical axis, but which eliminates geophone movement and sympathetic vibrations by securely locking the geophones in position along the three orthogonal axes before beginning the seismic wave detection stage.

In accord with the objects of the invention, a logging sonde according to the invention broadly comprises:

(a) a cylindrical body fixed to the sonde;

(b) a frame lodged inside the cylindrical body and free to rotate relative to said body about a longitudinal axis of said body;

(c) detector means supported by said frame and including at least one detector free to rotate relative to said frame; and (d) a locking device supported by said frame, said locking device including braking means which in a rest position are arranged in such a manner as to lock said detector means relative to the cylindrical body, and a solenoid for disengaging said braking means when said solenoid is excited so as to allow relative movement between said detector means and said cylindrical body.

In the particular case of a sonde intended for seismic acquisition, the frame lodged inside the cylindrical body is provided with an unbalanced mass, and the detector means comprises three geophones. A first of the three geophones is fixed to the frame and has its detection axis perpendicular to the plane formed by the longitudinal axis of the cylindrical body and the unbalanced mass. Because the frame is gimbal-mounted and free to rotate relative to the cylindrical body, for purposes of this application, the geophone fixed to the frame is said to be gimbal-mounted. The second and third geophones are free to rotate relative to the frame itself around axes which are parallel to the detection axis of the first geophone. The second and third geophones are respectively provided with second and third unbalanced masses serving to keep the detection axis of the second geophone in a horizontal plane and the detection axis of the third detector in a vertical plane.

In the preferred embodiment, the braking means of the locking device comprises resilient means, driving means, and braking shoes. The resilient means force the driving means, which is preferably a common rod, to apply a first braking shoe to an inside face of the cylindrical body, a second braking shoe against a disk fixed to the second geophone, and a third braking shoe against a disk fixed to the third geophone. The resilient means are diaphragm springs fixed to the frame. They are constituted by two spring blades having respective U-shaped openings.

The solenoid of the locking device of the invention may be excited either by direct or alternating current. The application of direct current to the solenoid permits the braking means to simultaneously release their respective braking surfaces, thereby permitting the frame (and geophone attached thereto) to rotate relative to the cylindrical body, and permitting those detectors not fixed to the frame to rotate relative to the frame. The application of alternating current to the solenoid on the other hand, acts to progressively brake rotary motion of the frame and the detectors.

For a better understanding of the present invention, together with further objects thereof, reference is had to the following description taken in conjunction with the accompanying drawings.

DETAILED DESCRIPTION OF THE PREFERRED EMBODIMENT

Figures 1, 2:
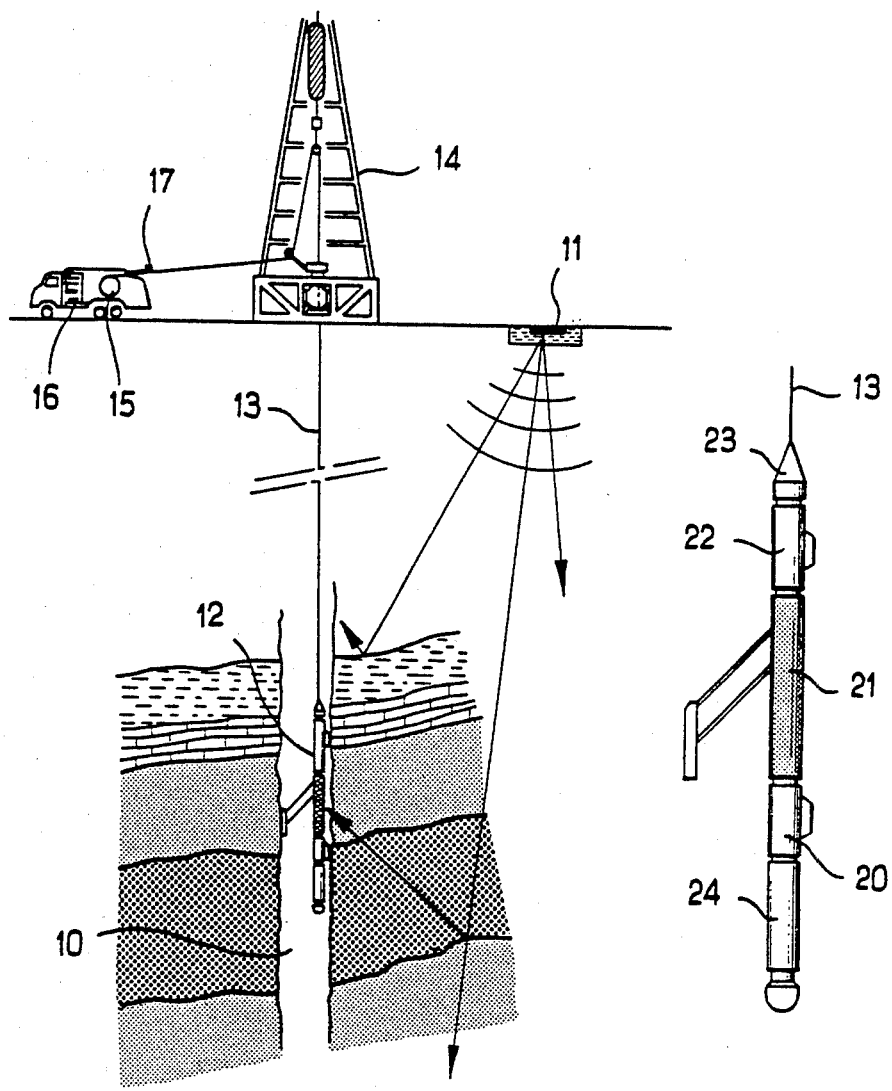
FIG. 1 shows an installation for seismic prospection in a borehole traversing a formation.
FIG. 2 shows the seismic acquisition sonde of FIG. 1 on a larger scale.

FIG. 1 shows an installation for seismic prospection in a borehole 10. A seismic source 11 emits seismic waves which, after passing through underground formations along various trajectories, are picked up by means of a seismic acquisition sonde 12. The sonde is suspended down the borehole 10 by means of an electric cable 13. The electric cable 13 passes over a set of pulleys attached to a derrick 14 and then through a device 17 for measuring the depth of the sonde before finally being wound around a winch 15. The electric cable 13 also supplies the sonde with electricity and provides duplex transmission between the sonde 12 and surface instrumentation 16.

As shown in FIG. 2, the sonde 12 is essentially comprised of four sections: a detector section 20 for detecting seismic signals; an anchoring section 21; an electronic cartridge 22 connected to the cable 13 via a head 23; and an electronic cartridge 24 placed at the bottom end of the sonde 12.

Figure 3:
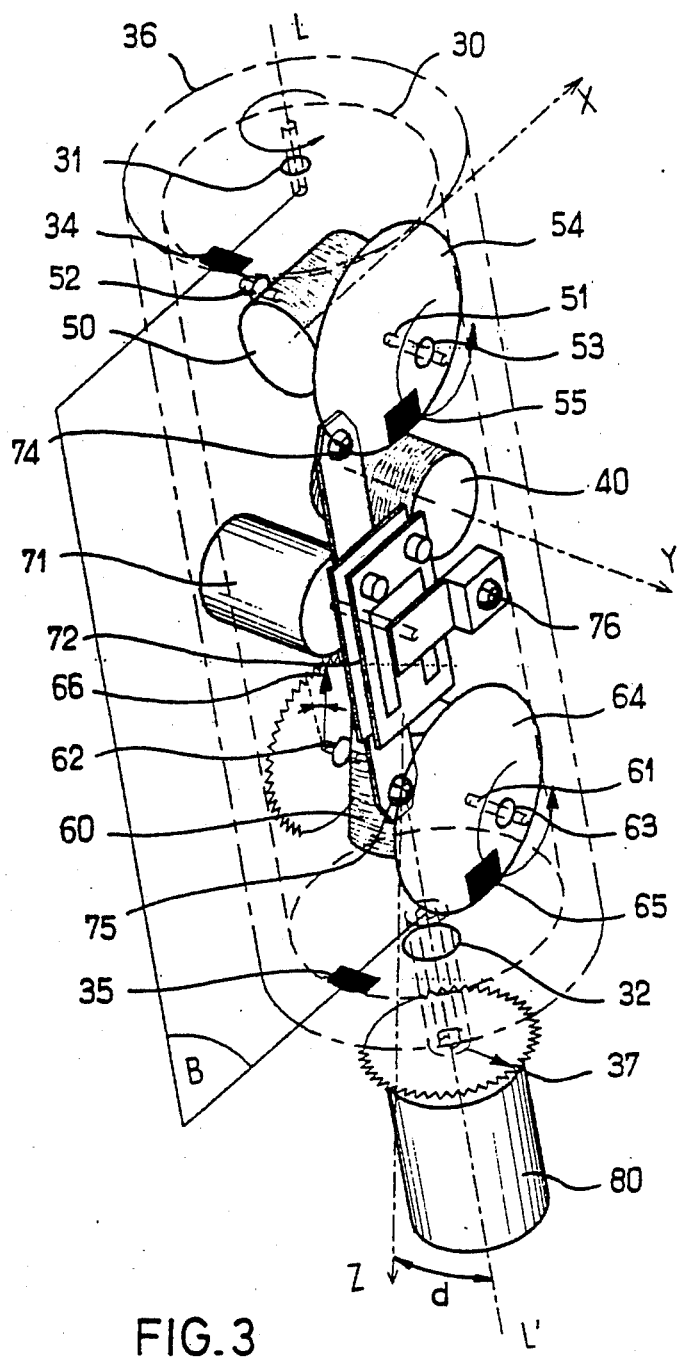
FIG. 3 is a diagram of the detector section of the sonde of FIG. 2 including three gimbal-mounted geophones.

Turning to FIG. 3, the detector section 20 of sonde 12 is shown in a detailed fashion. Detector section 20 comprises, in particular, a frame 30 which is lodged in a cylindrical body 36 that is fixed relative to the section 20. The frame 30 is rotatably (or gimbal-) mounted on two bearings 31 and 32, thereby enabling the frame to turn freely relative to the body 36 about the longitudinal axis LL' of the sonde 12. The frame 30 is additionally equipped with an unbalanced mass represented by two masses 34 and 35 which, together with the axis LL', define a plane B. Consequently, regardless of the orientation of the sonde 12, gravity will naturally tend to bring the plane B into a vertical position.

The detector section 20 of sonde 12 also includes detector means which is preferably comprised of three geophones. A first geophone 40 is fixed to the frame 30 and is oriented along an axis Y which is perpendicular to the longitudinal axis LL' of the sonde and to the above-defined plane B. Consequently, regardless of the orientation of the sonde 12, the axis Y of the geophone 40 is horizontal due to the effect of gravity. The geophone 40 is thus chosen to be a geophone whose optimum detection direction is horizontal.

Second and third geophones 50 and 60 have respective detector axes X and Z which are parallel to the plane B or are contained in the said plane. Each of the geophones 50 and 60 is mounted on a connection having one degree of freedom so as to be able to pivot about axes parallel to the axis Y (a second degree of freedom relative to cylindrical body 36 being provided by the ability of the frame 30 to rotate relative to the body 36). Thus, the second geophone 50 is fixed to a shaft 51 and is rotatably mounted relative to the frame 30 by means of bearings 52 and 53. A disk 54 perpendicular to the shaft 51 and fixed thereto is provided with an unbalanced mass represented by a mass 55. The disk 54 with mass 55 is arranged in such a manner that the axis X of the geophone 50 is always horizontal due to the effect of gravity on the unbalanced mass.

The third geophone 60 is similarly fixed to a shaft 61 and is rotatably gimbal-mounted relative to the frame 30 by means of bearings 62 and 63. A disk 64 perpendicular to the shaft 61 and fixed thereto is provided with an unbalanced mass represented by a mass 65. The disk 64 with mass 65 is arranged in such a manner that the axis Z of the geophone 60 is always vertical due to the effect of gravity. The tilt angle of the sonde, and consequently the angle of the borehole deviation, i.e. the angle d between the axis LL' and the vertical, is measured by means of a potentiometer 66 whose wiper position is determined by the rotation of shaft 61. Likewise, the orientation of the frame 30 relative to the body of the sonde 12 (and cylindrical body 36) is measured by means of a potentiometer 37 whose wiper is rotated by the frame 30.

Figure 4:
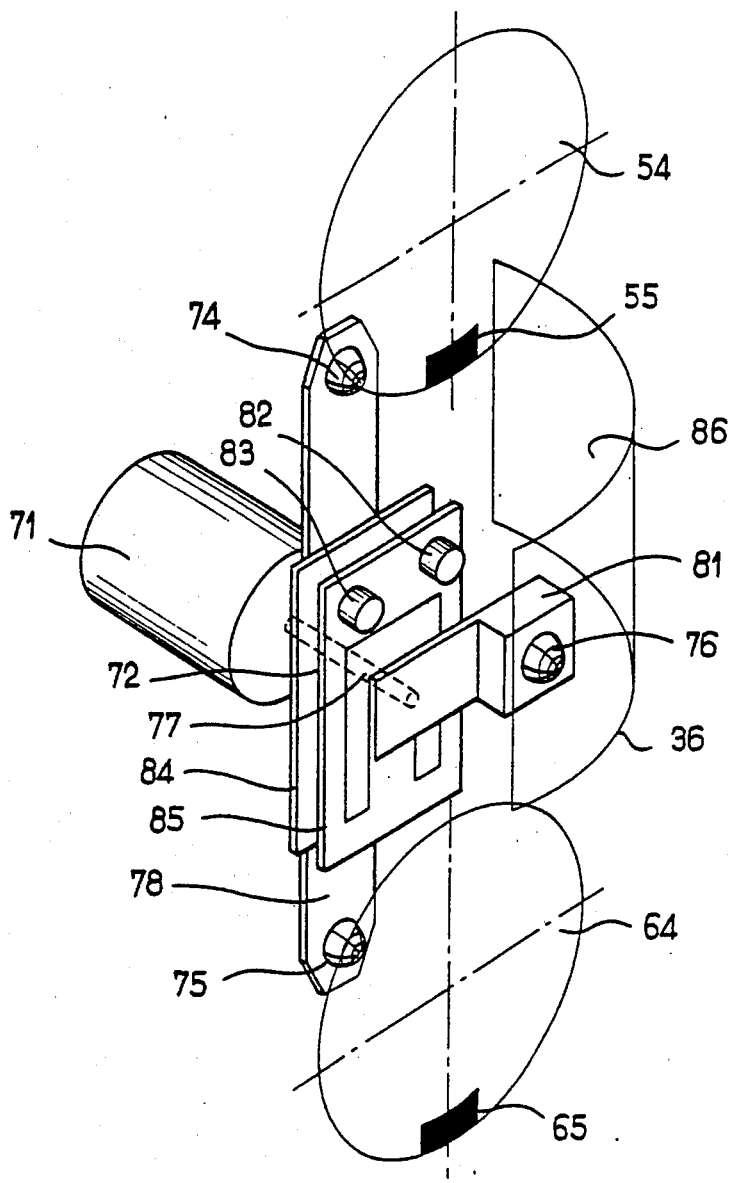
FIG. 4 is a larger scale diagram of the locking device of the sonde which is shown in part in FIG. 3.

The frame 30 also supports a locking device which, as seen in FIG. 4, preferably comprises a solenoid 71 and a braking means. The braking means preferably comprises resilient means 72, drive means 77 and 78, and 81 and brake shoes 74, 75, and 76. The drive means of the locking device preferably comprises a rod 77, a crossbar 78 and a plate 81, with the rod 77 being suitable for receiving a crossbar 78 which is arranged with brake shoes 74 and 75 at its respective ends. The end of the rod 77 also supports plate 81 fitted with a brake shoe 76. The position of each of the three brake shoes 74, 75, and 76 is adjustable by means of a conventional adjustment system familiar to the person skilled in the art.

The resilient means 72 are fixed to the frame 30 by means of screws 82 and 83. The resilient means 72 preferably comprise two diaphragm springs with two spring blades 84 and 85 which are spaced apart by a spacer (not shown) and which include respective U-shaped openings. Blades 84 and 85 engage the rod 77 which passes therethrough, and force the rod 77 in such a direction so as to apply the shoes 74, 75, and 76 against their braking surfaces. Thus, in its "rest position", rod 77 forces braking shoe 74 to engage the face of disk 54 and braking shoe 75 to engage the face of disk 64, while braking shoe 76 is forced to engage the inside surface 86 of the cylindrical body 36.

The rod 77 also passes through the core of a solenoid 71. So long as solenoid 71 is not excited, it has no effect on the rod 77. It therefore allows the spring-loaded rod to fully apply pressure via the shoes 74, 75, and 76 to the inside face 86 of the cylindrical body 36 and to the faces of the disks 54 and 64. Consequently, when solenoid 71 is not excited, the frame 30 and the geophones 40, 50, and 60 are completely locked relative to the body of the sonde 12. However, when the solenoid is excited by the application of direct current thereto, it forces rod 77 to move in a direction opposite to the direction of the pressure force provided by spring blades 84 and 85, thereby unlocking the geophones relative to the sonde 12 by separating the shoes 74, 75, and 76 from their respective braking surfaces. If alternating current is applied to the same solenoid, it applies alternating movement to the rod 77. Thus, instead of completely locking or freeing the frame 30 and the geophones 50 and 60 as respectively occurs with the application to the solenoid of no current or direct current, the frame and geophones move in a braked fashion until they occupy their equilibrium positions under the effect of gravity.

In sum, the locking device acts by means of a rod which under the effect of common spring means applies all three brake shoes against their respective braking surfaces so long as the solenoid remains unpowered. If the solenoid is excited by means of an electric current, the rod moves in the opposite direction to that applied by the resilient spring means and separates all three shoes simultaneously from their respective brake surfaces.

The electric wires (not shown), and in particular the wires for feeding the solenoid 71, the wires for conveying the signals detected by the geophones 40, 50, and 60, and the wires for the potentiometers 37 and 66 are preferably gathered by a collector 80. The collector 80 is typically connected to one and/or the other of the electronic cartridges 22 and 24 of sonde 12. Thus, the solenoid 71 may be controlled by the surface instrumentation 16, and the seismic signals detected by the geophones may be transmitted in analog or digital form to the surface instrumentation as is well known in the art.

In operation, a seismic acquisition sonde 12 fitted with the geophone-locking device of the invention is initially moved along the borehole to the desired detection level, with frame 30, and all three geophones 40, 50, and 60 being locked in position by the locking device. The anchoring section is then activated so as to anchor the detector section by means of the technique described in U.S. Pat. No. 4,563,757 to Clavier et al. Once the sonde has been anchored, a control signal is sent thereto from the surface instrumentation 16 to cause the solenoid 71 to be connected to a source of current for a period of time. The period of time of current connection (typically 10 to 15 seconds for the application of direct current) is chosen so as to be sufficient to separate the brake shoes 74, 75, 76 from their braking surfaces 54, 64, 86 and to allow the geophones 40, 50, 60 to take up the desired orthogonal configuration under the effect of gravity, i.e. to have the axis Z vertical and to have the axes X and Y horizontal. Once the solenoid current is interrupted, the shoes are automatically re-applied against their respective braking surfaces, thereby locking the geophones during seismic signal acquisition. Once signal acquisition has been completed, the anchor is released and the sonde 12 having frame 30 and geophones 40, 50, and 60 in a locked position is moved to the following borehole level. The sequence as described is then repeated.

Advantageously, the locking of the frame and the detecting means during the seismic signal acquisition stage not only prevents movement of the detecting means which could degrade the signal, but has the effect of stiffening the flexible connections which exist between the moving parts and their supports and thereby displacing the resonant frequencies of the sonde above the spectrum of interest. The fact that the brakes are always engaged when in their rest position also provides increased lifetime for the mechanical portion of the device, since the brake mechanism prevents the sub-assembly from suffering shock damage while the sonde is being transported and while it is being moved along the borehole.

There has been described and illustrated herein a sonde having locking means for locking gimbal-mounted detectors contained therein. While particular embodiments of the invention have been described, it is not intended that the invention be limited thereby, as it is intended that the invention be broad in scope and that the specifications be read likewise. Thus, those skilled in the art will recognize that various aspects of the invention may be modified. For example, an equivalent system to the rod and crossbar could be substituted as the drive mechanism for applying the braking pads to their braking surfaces. Likewise, instead of the spring blades with U-shaped openings, some other kind of resilient means could be used to force the rod and crossbar to cause the brake shoes to engage their braking surfaces. Moreover, while the invention was described in terms of a cylindrical body fixed to the sonde, the cylindrical body may be considered the outer shell of the sonde itself.

Further, it is clear that the invention described is applicable not only to a set of geophones, but also to any set of detectors including at least one detector which is rotatably mounted inside a rotating frame (i.e. with two degrees of freedom). If the detectors are small, it would be possible, in particular, to mount two or more detectors on the same axis of rotation. Indeed, not only may the number of detectors be increased, but the number of brake shoes may likewise be increased. Therefore, it will be apparent to those skilled in the art that other changes and modifications may be made to the invention as described without departing from the spirit and scope of the invention as so claimed.

We claim:

1. A logging sonde, comprising:

(a) a cylindrical body fixed to said sonde;
(b) a frame lodged inside said cylindrical body and free to rotate relative to said body about a longitudinal axis of said body;
(c) detector means supported by said frame and including at least one detector free to rotate relative to said frame; and
(d) a locking device supported by said frame, said locking device including braking means which is arranged in such a manner as to lock said detector means relative to the cylindrical body, and a release means for unlocking said detector means so as to allow relative movement between said detector means and said cylindrical body when said release means is activated.

2. A sonde according to claim 1, wherein:
said frame is arranged with an unbalanced mass enabling a reference plane which is defined by said unbalanced mass and said longitudinal axis of said body to maintain a vertical orientation; and
said at least one detector includes a detector having a detection axis perpendicular to said reference plane.

3. A sonde according to claim 2, wherein:
said detector means comprises three geophones, and a first geophone of said three geophones is fixed to said frame and has a detection axis perpendicular to a plane defined by the longitudinal axis of said cylindrical body and said unbalanced mass;
a second and a third geophone of said three geophones are each free to rotate relative to said frame about at least one axis parallel to the detection axis of said first geophone; and
said second geophone is provided with a second unbalanced mass enbaling the detection axis of the second geophone to be maintained in a horizontal plane, and said third geophone is provided with a third unbalanced mass enbaling the detection axis of the third geophone to be maintained in a vertical plane, said detection axes of said first, second, and third geophones being orthogonal.

4. A sonde according to claim 3, wherein:
said release means is a solenoid, and said braking means comprises resilient means, driving means, and a plurality of braking shoes such that in a rest position said resilient means forces said driving means to engage a first braking shoe with an inside face of said cylindrical body, a second braking shoe with a disk fixed to said second geophone, and a third braking shoe with a disk fixed to said third geophone.

5. A sonde according to claim 4, wherein:
said braking means is arranged to simultaneously release a braking shoe from said inside face of said cylindrical body and braking shoes from said disks fixed to said second and third geophone, and permit said frame to rotate relative to said cylindrical body and said second and third geophones to rotate relative to said frame when said solenoid is excited by direct current 6. A sonde according to claim 5, wherein:
said resilient means comprises at least one diaphragm spring fixed to said frame.

7. A sonde according to claim 6, wherein:
said diaphragm springs comprise two spring blades having respective U-shaped openings.

8. A sonde according to claim 5, wherein:
said drive means comprise a rod, a crossbar fitted with at least one of said braking shoes, and a plate fitted with one of said braking shoes;
said crossbar and said plate are attached to said rod; and
said rod is attached to said resilient means, and extends through the core of said solenoid by which it is driven when said solenoid is excited by the application of current.

9. A sonde according to claim 4, wherein:
said braking means are arranged to progressively brake rotation of said frame and of said second and third geophones when said solenoid is excited by alternating current.

10. A sonde according to claim 9, wherein:
said resilient means comprises at least one diaphragm spring fixed to said frame.

11. A sonde according to claim 18, wherein:
said diaphragm springs comprise two spring baldes having respective U-shaped openings.

12. A sonde according to claim 9, wherein:
said drive means comprise a rod, a crossbar fitted with at least one of said braking shoes, and a plate fitted with one of said braking shoes;
said crossbar and said plate are attached to said rod; and
said rod is attached to said resilient means, and extends through the core of said solenoid by which it is driven when said solenoid is excited by the application of current.

13. A sonde according to claim 3, wherein:
said braking means comprises resilient means, driving means, and a plurality of braking surfaces such that in a rest position said resilient means forces said driving means to engage a first braking surface with an inside face of said cylindrical body, a second braking surface with a disk fixed to said second geophone, and a third braking surface with a disc fixed to said third geophone.

14. A sonde according to claim 13, wherein:
said braking means is arranged to simultaneously release a braking surface from said inside face of said cylindrical body and braking surfaces from said disks fixed to said second and third geophone, and permit said frame to rotate relative to said cylindrical body and said second and third geophones to rotate relative to said frame when said release means is activated.

15. A sonde according to claim 14, wherein:
said release means is a solenoid;
said drive means comprises a rod, a crossbar having at least one of said braking surfaces, and a plate having at least one of said braking surfaces;
said crossbar and said plate are attached to said rod; and
said rod is attached to said resilient means, and extends through the core of said solenoid by which it is driven when said solenoid is excited by the application of current.

16. A logging sonde for detecting seismic waves having a predetermined frequency spectrum, comprising:
(a) a cylindrical body fixed to said sonde;
(b) a frame lodged inside said cylindrical body and free to rotate relative to said body about a longitudinal axis of said body;
(c) detector means supported by said frame and including at least one detector free to rotate relative to said frame; and (d) a locking device supported by said frame, said locking device including means for locking said detector means relative to said cylindrical body thereby causing the resonant frequencies of said sonde and said detector means to be located outside said predtermined frequency spectrum of said seismic waves, wherein when said detector means are unlocked relative to said cylindrical body relative movement between said detector means and said cylindrical body is allowed.

17. A logging sonde according to claim 16, wherein:
said frame is arranged with an unbalanced mass enbaling a reference plane which is defined by said unbalanced mass and said longitudinal axis of said body to maintain a vertical orientation; and
said detector means comprises three geophones with a first geophone of said three geophones fixed to said frame and having a detection axis perpendicular to said reference plane, and
a second and third geophone of said three geophones being free to rotate relative to said frame about at least one axis parallel to the detection axis of said first geophone, where the second geophone is provided with a second unbalanced mass enabling the detection axis of the second geophone to be maintained in a horizontal plane, and the third geophone is provided with a third unbalanced mass enabling the detection axis of the third geophone to be maintained in a vertical plane, said detection axes of said first, second, and third geophones being orthogonal.

18. A logging sonde according to claim 16, wherein:
said means for locking said detector means relative to said cylindrical body includes a braking means, and
said locking means includes a release means for unlocking said detector means relative to said cylindrical body and allowing relative movement between said detector means and said cylindrical body.

19. A logging sonde according to claim 17, wherein:
said means for locking said detector means relative to said cylindrical body includes a braking means, and
said locking means includes a release means for unlocking said detector means relative to said cylindrical body and allowing relative movement between said detector means and said cylindrical body.

20. A logging sonde according to claim 19, wherein:
said braking means comprises resilient means, driving means, and a plurality of braking surfaces such that said resilient means can force said driving means to engage a first braking surface with an inside face of said cylindrical body, a second braking surface with a disk fixed to said second geophone, and a third braking surface with a disc fixed to said third geophone.

* * * * *